C. E. FEAR.
HORSEHOOF APPLIANCE.
APPLICATION FILED OCT. 9, 1909.
956,955.
Patented May 3, 1910.
2 SHEETS—SHEET 1.
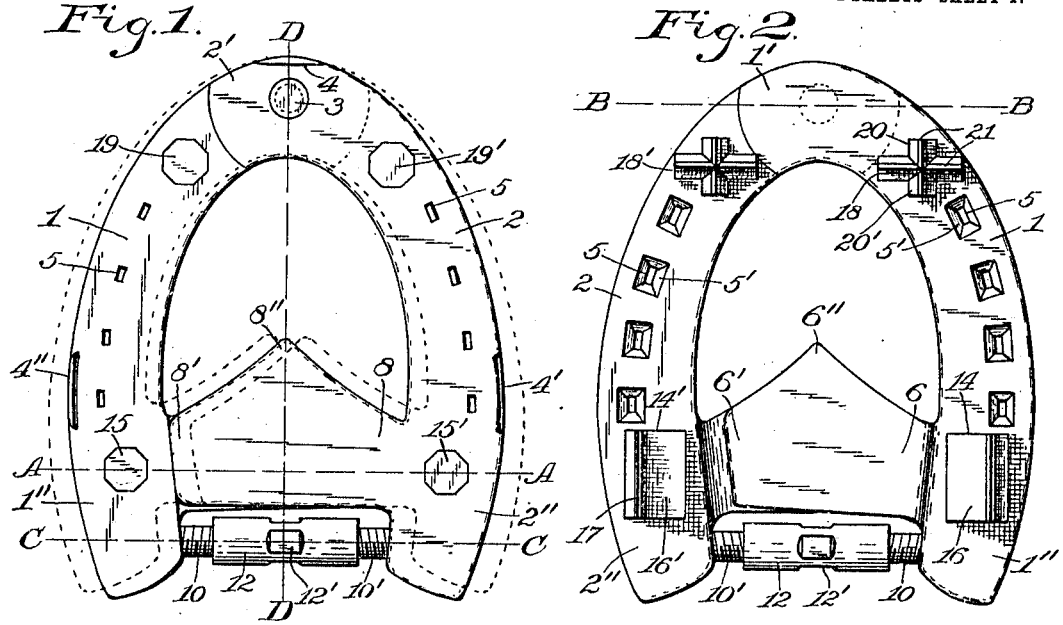
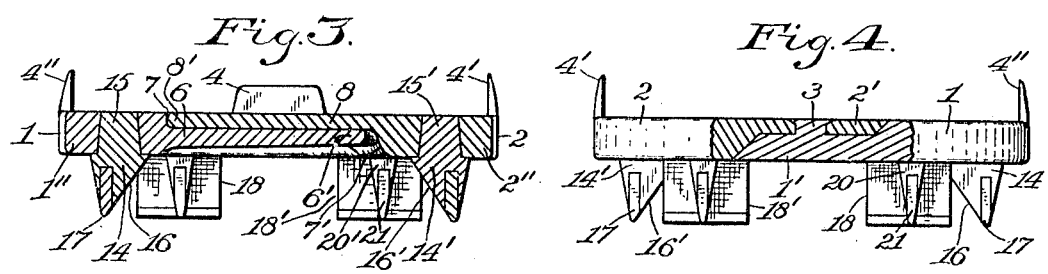
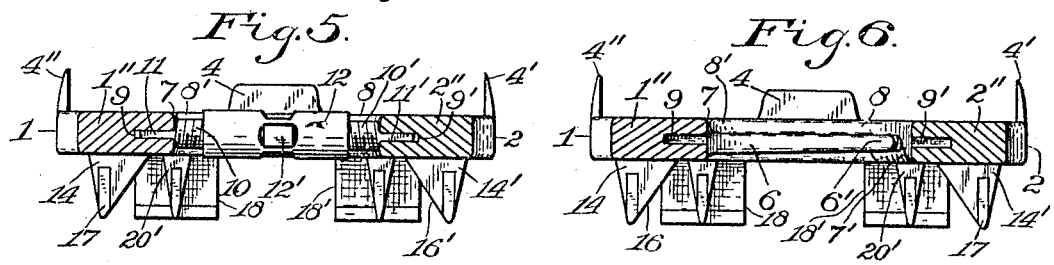
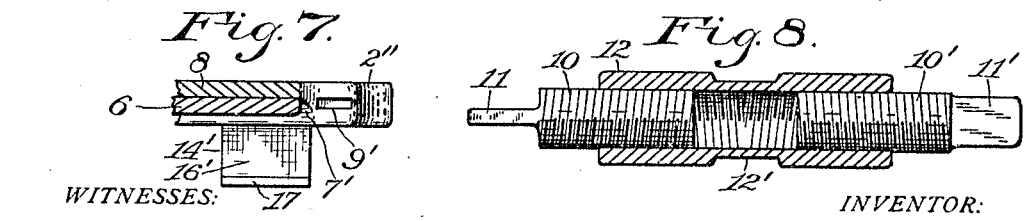
WITNESSES:
J. H. Gardner
K. R. Woddell
INVENTOR:
Charles E. Fear,
BY
E. T. Silvius,
ATTORNEY.

C. E. FEAR.
HORSEHOOF APPLIANCE.
APPLICATION FILED OCT. 9, 1909.
956,955.
Patented May 3, 1910.
2 SHEETS—SHEET 2.
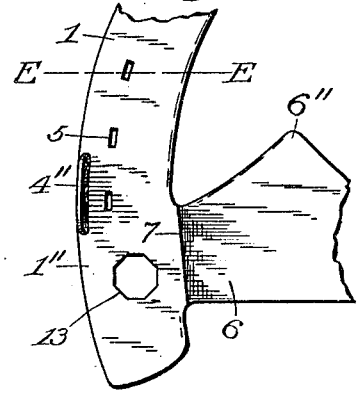
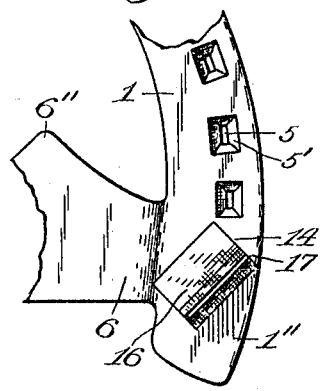
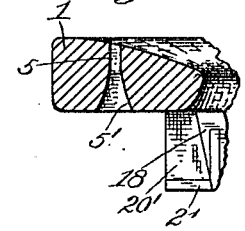
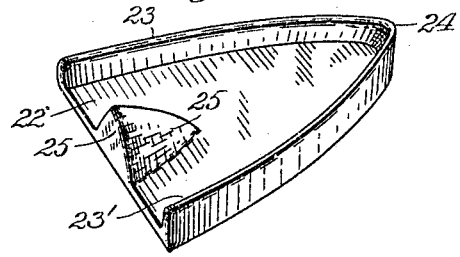
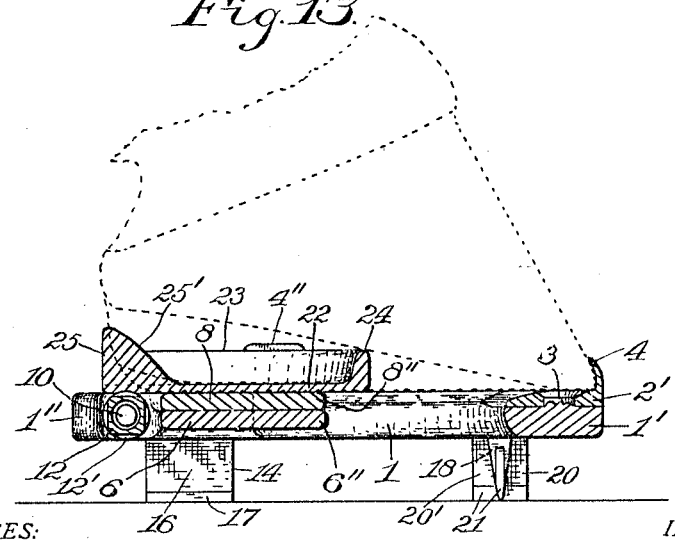
WITNESSES:
J. H. Gardner
K. R. Woddell
INVENTOR:
Charles E. Fear,
BY
E. T. Silvius,
ATTORNEY.

UNITED STATES PATENT OFFICE.

CHARLES E. FEAR, OF INDIANAPOLIS, INDIANA.

HORSEHOOF APPLIANCE.

956,955. Specification of Letters Patent. Patented May 3, 1910.

Application filed October 9, 1909. Serial No. 521,896.

*To all whom it may concern:*

Be it known that I, CHARLES E. FEAR, a citizen of the United States, residing at Indianapolis, in the county of Marion and State of Indiana, have invented certain new and useful Improvements in Horsehoof Appliances; and I do declare the following to be a full, clear, and exact description of the invention, reference being had to the accompanying drawings, and to the figures of reference marked thereon, which form a part of this specification.

This invention relates to appliances which are designed to be made use of by veterinarians in treatment of the hoofs of animals, such as horses, mules, or other animals, which appliances are adapted to serve the purposes of affording relief to diseased hoofs, to prevent diseases of the hoofs, and to serve the purpose of shoes for the animals, the invention having reference particularly to appliances of the above-mentioned character that are designed to afford support for the frog of the hoof and permit the hoof to naturally spread at the heel while shod, the invention relating also to appliances whereby the hoof may be designedly spread at the heel.

The object of the invention is to provide improved appliances for the hoofs of animals that will be adapted to be used as shoes until worn out, and have appliances connected therewith that will enable the veterinarian to advantageously treat the hoof either to prevent disease or to eradicate disease of the hoof in cases where the hoof requires support for the frog or spreading of the hoof; a further object being to provide improved adjustable calks for the shoes that will be adapted to be beneficial in the verterinarian's practice, to aid in spreading the hoof, and serve to prevent the animal from slipping on ice, the calks being adapted to be removed so that the shoes may be used without them, and therefore be durable and economical in use.

With the above-mentioned and minor objects in view, the invention consists in a shoe comprising two novel parts hinged together, and each part having a plate thereon for supporting the frog of the hoof, the plates coöperating one with the other and being relatively adjustable, said hinged parts having each a socket in the heel portion thereof, adjusting screws inserted removably in the sockets, for spreading the hinged parts of the shoe, removable and adjustable calks, and a filling plate of novel construction to be used on the frog supporting plates; and the invention consists further in the novel parts, and combinations and arrangements of parts as hereinafter particularly described and then defined in the accompanying claims.

Referring to the drawings Figure 1 is a top plan of a horse-shoe constructed substantially in accordance with the invention; Fig. 2, an inverted plan thereof; Fig. 3, a section on the line A A in Fig. 1; Fig. 4, a section on the line B B in Fig. 2; Fig. 5, a section on the line C C in Fig. 1; Fig. 6, a section also on the line C C in Fig. 1 minus the adjusting screws; Fig. 7, a fragmentary section on the line D D in Fig. 1; Fig. 8, a longitudinal section of the adjusting screw devices; Fig. 9, a fragmentary top plan minus the heel calk; Fig. 10, a fragmentary inverted plan showing the heel calk adjusted differently to that in Fig. 2; Fig. 11, a fragmentary section on the line E E in Fig. 9; Fig. 12, a perspective view of the filling plate for the shoe; and Fig. 13, a longitudinal section on the line D D in Fig. 1 showing the shoe with respect to a horse's hoof, the outlines of which are indicated by broken lines.

Similar reference characters throughout the different figures of the drawings indicate like parts or features of construction referred to herein.

In practically carrying out the invention a shoe is provided that comprises two principal parts or "quarters" 1 and 2 of suitable contour to conform to a hoof in the usual manner, the part 1 having a toe portion 1' that is slightly thinner than the remainder of the part, the heel portion 1'' of the part being of novel construction as will further appear. The companion part 2 has a toe portion 2' that is considerably thinner than the remainder of the part, and the heel portion 2'' of the part 2 is also of novel construction as will be further explained. The toe portion 1' of the part 1 is designed to withstand considerable wear and has an integral pivot 3 on its upper side whereby the toe portion 2' is connected pivotally to the portion 1', said portion 2' being relatively thin, but lying upon the portion 1' is not subject to wear, there being a lip 4 on the outer edge of the portion 2' to engage the hoof, the parts 2 and 1 being provided at their rear portions as usual with lips 4' and 4" respectively to engage the opposite sides of the hoof as usual, each principal part of the shoe having nail holes 5 therein extending from recesses 5' in the under side of the shoe to receive securing nails as usual. The inner side of the part 1 is provided with a supporting plate 6 that extends from the heel portion of the part toward the heel portion of the companion part, the plate having a relatively thinner end portion 6' and a projection 6" extending toward the toe portion of the shoe in order to provide ample bearing surface for the frog of the hoof. The upper surface of said plate is in a plane somewhat lower than the plane of the top of the shoe, so that a shoulder 7 is formed at the inner side of the shoe at the base of the plate. The companion part 2 is provided with a companion supporting plate 8 whose end 8' extends to the shoulder 7 when the shoe is adjusted to its minimum size, said plate 8 having its upper surface flush with the top of the shoe while the plate rests upon the plate 6, said plate 8 having a projection 8" that extends forward upon the projection 6", the two plates 6 and 8 having sliding contact one with another and as will be seen have considerable width longitudinally of the shoe, and are designed to have contact with the frog of the hoof under usual conditions, so as to assist in preventing disease of the frog or to assist in healing a diseased frog which, as is known should perform the function of assisting in supporting the hoof of the animal. The end portion 6' of the plate 6 may extend to any desirable distance toward the shoulder 7' formed under the plate 8 at the base thereof. It will be seen that when the shoe is attached to a hoof the hoof may expand at the heel naturally and without hindrance by the shoe.

In some cases it is desirable to slightly expand the hoof, and in order to do so the heel portions of the shoe are provided with two sockets 9 and 9' in the inner side of the portions 1" and 2" rearward of the supporting plates. A pair of reversely threaded screws 10 and 10' are provided with shanks 11 and 11' respectively that are inserted in the sockets, the screws being inserted in the opposite ends of a reversely threaded sleeve 12 that has external facets 12' to be engaged by a wrench, for turning the sleeve on the screws whereby to force the heel portions of the shoe apart and consequently expand the hoof.

The shoe is provided with a suitable number of holes 13 that are octagonal in cross section to receive the shanks of the calks, there being two heel calks 14 and 14' having shanks 15 and 15' respectively that are driven into the holes and may be forcibly removed therefrom, the calks being alike and having inclined inner sides 16 and 16' respectively, so that in use they will have a tendency to force the heel portions of the shoe apart when in contact with the ground or on gravel roads particularly, the opposite or outer sides of the calks being nearly perpendicular to the face of the shoe. Each calk preferably is composed of wrought-iron or malleable iron and has a relatively hard wearing piece 17 set therein and suitably secured, so as to slightly project beyond the body portion of the calk and maintain a relatively sharp wearing end to prevent slipping on ice. The forward portions of the parts 1 and 2 are provided with calks 18 and 18' that usually extend transversely and are secured to the shoe parts by means of shanks 19 and 19' which are octagonal in cross section as are the shanks 15 and 15', so that they are all interchangeable and may be transposed if desired into different positions. Each calk has wings 20 and 20' extending forward and rearward respectively from the middle portion thereof, so that each calk in plan is provided with a longitudinally extending edge as well as a transversely extending edge, and preferably is provided with the relatively hard wearing pieces 21 in the projecting portions thereof.

A filling plate 22 is provided that has a flat under side adapted to rest upon the supporting plate 8, the plate having upturned flange portions 23 and 23' adapted to embrace opposite sides of the frog, the flange portions converging forwardly and forming a loop 24 on the forward end of the plate to engage the forward end of the frog, the plate having also a projection 25 on the rear portion thereof that has a sloping forward side 25 adapted to engage the rear side of the frog of the hoof to hold the filling plate in proper position, said plate being desirable in many cases when it is undesirable to pare the hoof away sufficiently to permit the frog to rest upon the plate 8, or when the frog has shrunken away, so that it will not extend to the plate 8. It should be understood that the plates 22 may be made in various thicknesses, as may be required.

In practical use the shoe is attached to the hoof in the usual manner after the sleeve 12 has been adjusted, so as to bring the shoe to the requisite size for the hoof, and then the adjusting screws may be removed if not required, and when it is desired to slightly expand the hoof the adjusting screws may readily be inserted and manipulated as may be required, and then if desired may be quickly removed from the shoe. When the hoof expands it will be seen that the supporting plate for the frog expands also by reason of the plates 6 and 8 sliding one upon the other. When the animal steps in a faulty manner the veterinarian may shift or change the calks as may be required to overcome the tendency to wear the calks away unevenly, or they may be adjusted rotatively as indicated, and as will be seen the calks may be removed entirely so that a smooth shoe remains.

Having thus described the invention, what is claimed as new, is—

1. Hoof appliances comprising two hingedly connected curved shoe parts, a frog-support supported by the two shoe parts, and a filling plate slidingly mounted on the frog-support to coöperate therewith.

2. Hoof appliances comprising two curved shoe parts having each a frog-supporting plate thereon between its end portions and a socket in one of the end portions between the end and the plate, said plates being imperforate and adapted to slide in contact each with the other, a pivot connecting the opposite end portions of the shoe parts together, and expanding appliances insertible removably in the sockets.

3. Hoof appliances comprising two connected curved shoe parts, a frog-support supported by the two parts, and a filling plate to rest upon the frog-support and having forwardly converging upturned flange portions on opposite edges and also a projection on the rear end portion thereof, the projection having a sloping forward side presented toward the converging flange portions.

In testimony whereof, I affix my signature in presence of two witnesses.

CHARLES E. FEAR.

Witnesses:
P. A. HAVELICK,
E. T. SILVIUS.